Feb. 8, 1927. 1,616,629
D. JORDAN
MOWER
Filed Oct. 20, 1923 2 Sheets-Sheet 1
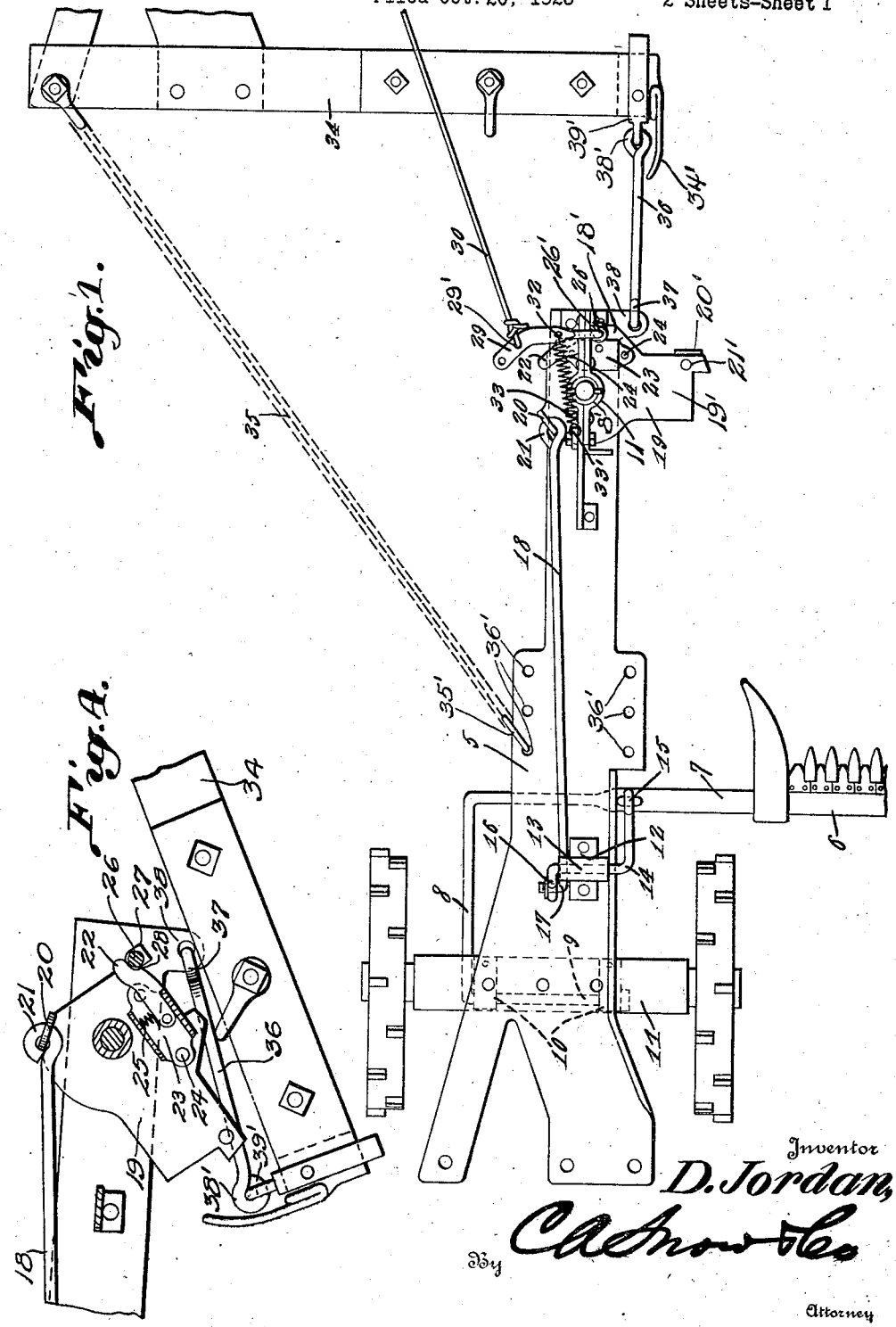
Inventor
D. Jordan,
By C. A. Snow & Co.
Attorney Feb. 8, 1927.  1,616,629
D. JORDAN
MOWER
Filed Oct. 20, 1923  2 Sheets-Sheet 2
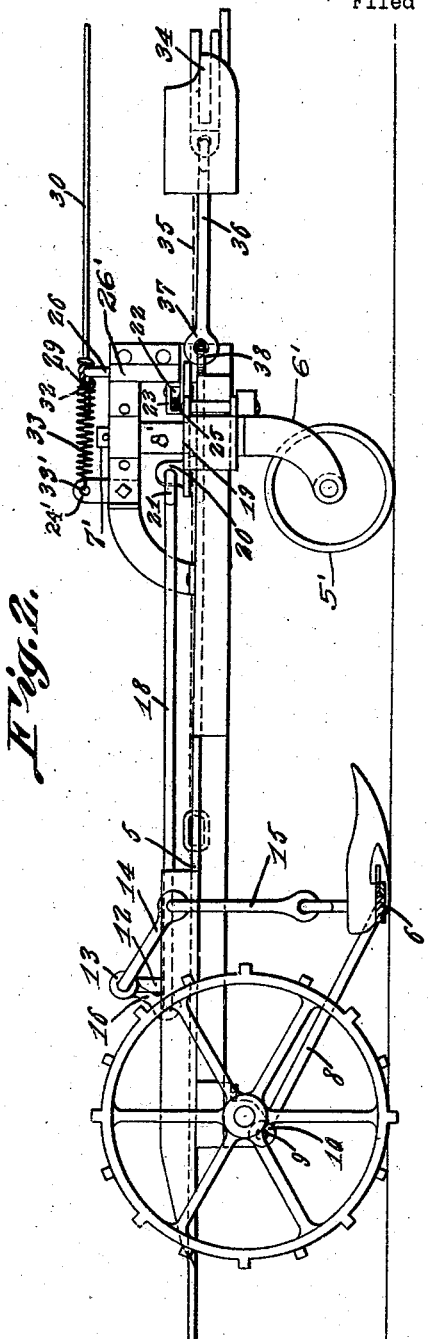
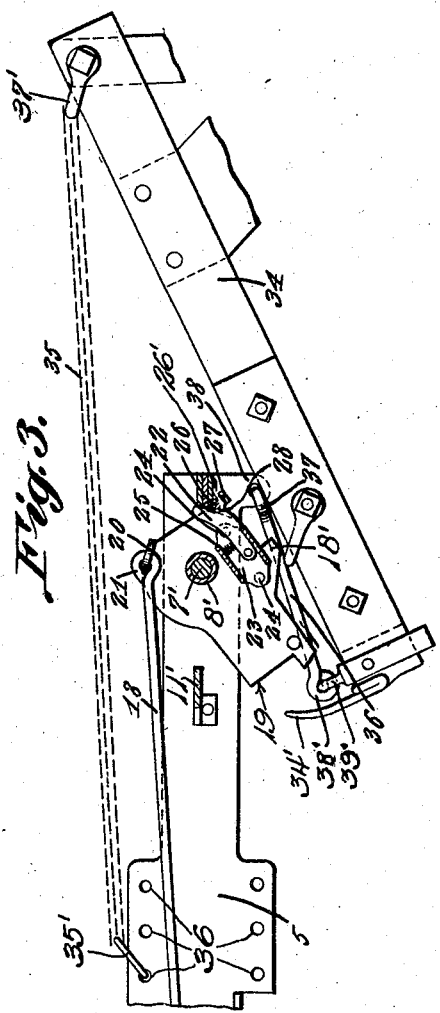
Inventor
D. Jordan,
By C. A. Snow & Co.
Attorney Patented Feb. 8, 1927.

1,616,629

UNITED STATES PATENT OFFICE.

DANIEL JORDAN, OF HARRISON, NEBRASKA.

MOWER.

Application filed October 20, 1923. Serial No. 669,818.

This invention relates to a device to be employed for automatically raising and lowering the guard bar of a mower, while the mower is being turned, thereby enabling the operator to control the mower from a point remote from the mower.

Another object of the invention is to provide a device of this character which will temporarily lock the guard bar in its elevated position, to prevent the guard bar from dropping to its active position, simultaneously with the straightening of the mower.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a mower equipped with a controlling device constructed in accordance with the present invention.

Figure 2 is a side elevational view thereof.

Figure 3 is an enlarged detail view of the controlling device.

Figure 4 is an enlarged detail view disclosing the operating member, and latch member carried thereby.

Referring to the drawings in detail, the reference character 5 designates the mower frame, which is of the usual construction and provided with the usual guard bar 6.

The guard bar includes a relatively long supporting arm 7 having a right angled portion 8 terminating in a right angled arm 9, which arm 9 is supported in the bearings 10 that are mounted at a point directly under the supporting axle 11 of the mower.

The forward end of the frame is supported by the wheel 5' and the supporting arms 6' that have an upwardly extended bolt 7' fitted in the bearing 8' forming a part of the frame, for guiding the mower. The bearing 8' is mounted in bracket 11' supported at the forward end of the frame.

Mounted on the mower frame 5 and extending upwardly therefrom is a support 12 having a bearing 13 at its upper end, which bearing receives the crank arm 14 that has one of its ends connected to the arm 7 at 15, the opposite end of the crank arm 14 extending downwardly at 16 where the same has connection with the right angled end 17 of the controlling rod 18.

The reference character 19 designates an operating member including an upper plate 19' and a lower plate 20' which plates are held in spaced relation by means of the pin 21'. The member 19 is formed with an upstanding head 20 that is apertured to receive the end 21 of the operating rod 18 so that pivotal movement of the operating plate results in a relative movement of the rod 18 to accomplish the purpose of the invention. A shoulder 18' is formed on the member 19 which shoulder is adapted to engage the lug 27 when the member 19 is moved to the limit of its forward movement as shown by Figure 1.

A latch member is indicated at 22 and is mounted in the latch support 23, which latch support is secured to the operating plate 19 by means of rivets 24, there being provided a coiled spring 25 mounted in the latch support 23 and engaging the latch member 22 to normally urge the latch member towards one side of the latch support. Cooperating with the latch member 22 is a vertical rod 26 journaled in the bearing 26', the rod being formed with a lug 27 on its lower end, which lug is adapted to move beyond the shoulder 28 of the latch member as clearly shown by Figure 3 of the drawings, so that the operating plate 19 will be held against movement which would return the cutter bar to its active position.

At the upper end of the rod 26 is a laterally extending arm 29 formed with openings 29' to accommodate one end of the flexible connecting member 30, the opposite end thereof being secured at a point adjacent to the operator seated on the tractor pulling the mower, so that the operator may readily and easily control the locking device.

A coiled spring 33 has connection with the arm 29 at 32, the opposite end of the spring being anchored at 33' to the ear 24' forming a part of the bracket 11' so that the spring may normally tend to move the arm 29 to its inactive position. The reference character 34 designates the rear hitch bar of the tractor pulling the mower, which bar is connected at one of its ends, to the body portion 5 through the medium of the chain 35, that includes link 35' positioned in one of the spaced openings 36' formed in the mower frame 5, the opposite end of the chain being connected to bar 34 with link 37'.

The opposite end of the bar 34 is connected with the body 5 through the medium of the link 36 which has one end thereof formed into an eye 37 that cooperates with the ear 38 at the forward end of the body portion, the opposite end of the link having an eye 38' for connection with the eye 39' of the clevis carried by the bar 34.

At one end of the bar 34 is a guard 34' that extends rearwardly to guard the connection between the link 36 and bar 34.

In the operation of the device, assuming that the bar 34 is turned from a position as shown by Figure 1, to a position as shown by Figure 3 of the drawings. The link 36 contacts with the pin 21' moving the member 19 rearwardly to a position as shown by Figure 3. With this movement of the plate or member 19 it is obvious that the rod 18 is moved forwardly with the result that the downwardly extended end of the crank arm 14 is swung forwardly. It follows that the opposite end of the crank arm moves upwardly carrying with it the guard bar 7 elevating the guard bar to its inactive position.

When the member 19 is moved to operate the rod 18 to move the guard bar 7 to its inactive position, the latch member automatically moves to a position as shown by Figure 4 of the drawings to hold the member 19 against returning to its active position under the weight of the guard bar.

After the tractor and mower have turned, and it is desired to cause the guard bar to fall downwardly to its active position, the flexible connecting member 30 is pulled, which in turn causes the rod 26 to move to a position to allow the latch member to return to its inactive position when the member 19 is returned under the weight of the guard bar.

I claim:—

1. In a device of the character described, a mower frame, a guard bar having an arm formed at one end thereof, means for pivotally connecting the arm to the mower frame, a crank arm supported on the mower frame, means for connecting one end of the crank arm to the guard bar, and means having connection with the opposite end of the crank arm for automatically raising and lowering the guard bar.

2. In a device of the character described, a mower frame, a guard bar having a right angled end portion terminating in a right angled arm, means for pivotally connecting the arm to the mower frame, a crank arm supported on the mower frame, a link for connecting one end of the crank arm and the guard bar, a rod having connection with the opposite end of the crank arm, a pivoted member on the forward end of the mower frame, said rod having connection with the pivoted member, a hitch bar, a link connecting the hitch bar to the forward end of the mower frame, a pin carried by the pivoted member, the last mentioned link being supported to engage the pin to move the pivoted member, and means for locking the pivoted member against movement.

3. In a device of the character described, a mower frame, a guard bar pivotally mounted on the mower frame, a crank arm having connection with the guard bar, a pivoted controlling plate mounted on the frame, a rod connecting the plate and crank arm, a pin carried by the plate, means for engaging the pin to operate the rod and crank arm to raise the guard bar, and a latch member cooperating with the pivoted plate for automatically locking the plate to hold the guard bar in its raised position.

4. In a device of the character described, a mower frame, a hitch bar, a connecting link connecting the mower frame, and hitch bar, a guard bar pivotally mounted on the mower frame, a pivoted plate supported at the forward end of the mower frame, means for moving the pivoted plate, means for connecting the plate and guard bar to elevate the guard bar, and means for automatically locking the plate when the guard bar is elevated.

5. In a device of the character described, a mower frame, a guard bar mounted for vertical movement with respect to the mower frame, a pivoted operating plate mounted at the forward end of the mower frame, a crank arm supported by the mower frame, means for connecting the crank arm and guard bar, a rod for connecting the crank arm and operating plate, a manually releasable pivoted locking member associated with the plate for locking the plate against movement, and means for releasing the locking member.

6. In a device of the character described, a mower frame, a hitch bar pivotally connected with the mower frame, a link connected with the mower frame and hitch bar, a pivoted plate on the mower frame, a guard bar, means for mounting the guard bar on the mower frame for vertical movement, said link being supported to move the pivoted plate, and said pivoted plate being supported to raise and lower the guard bar.

In testimony that I claim the foregoing as my own, I have hereto affixed my signature.

DANIEL JORDAN.